UNITED STATES PATENT OFFICE.

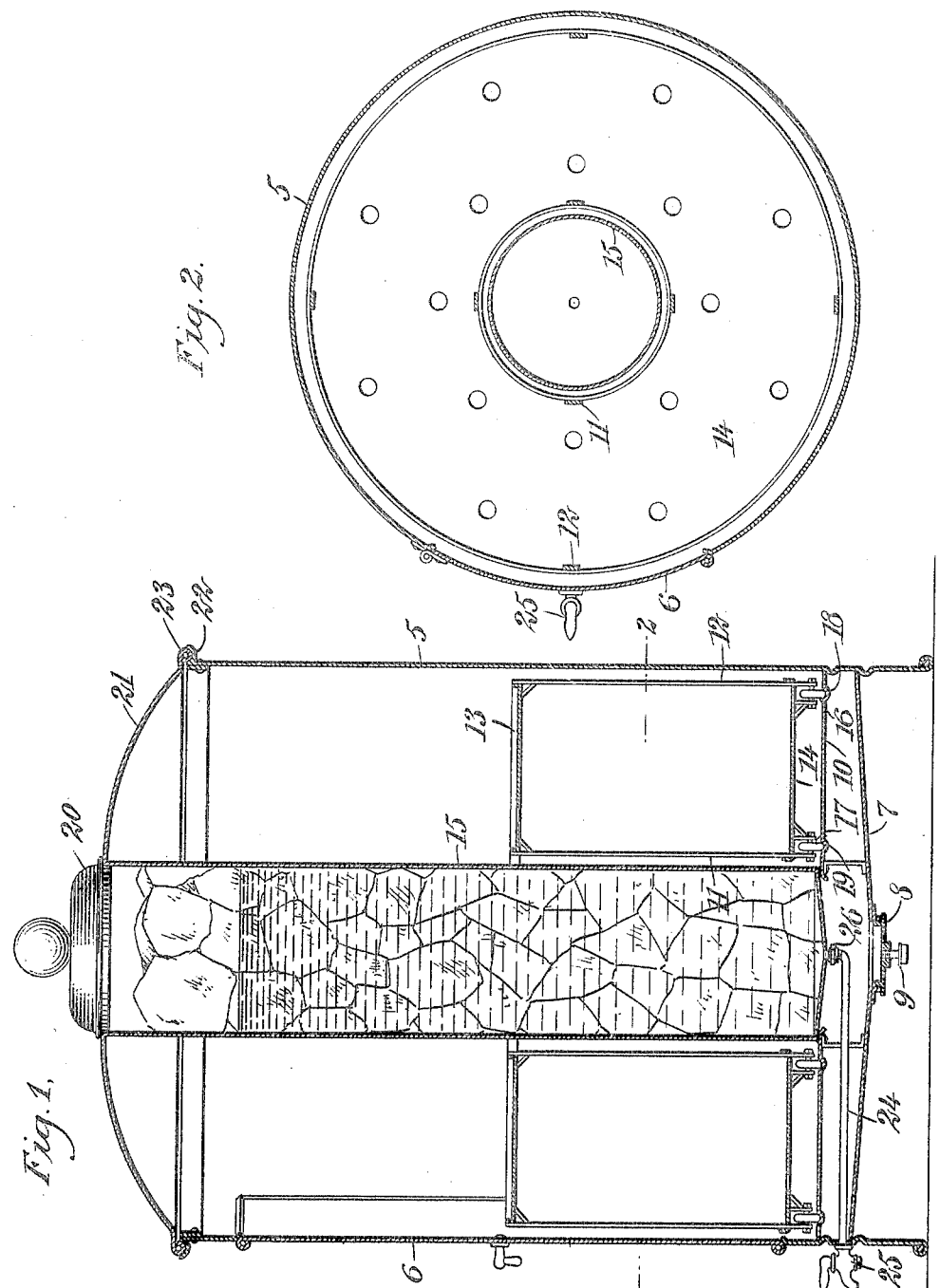

JOHN WILLSON BROWN, OF KNOXVILLE, TENNESSEE.

WATER-COOLER AND REFRIGERATOR.

No. 802,192.　　　Specification of Letters Patent.　　　Patented Oct. 17, 1905.

Application filed March 29, 1905. Serial No. 252,652.

*To all whom it may concern:*

Be it known that I, JOHN WILLSON BROWN, a citizen of the United States, and a resident of Knoxville, in the county of Knox and State of Tennessee, have invented a new and Improved Water-Cooler and Refrigerator, of which the following is a full, clear, and exact description.

This invention relates to improvements in water-coolers and refrigerators, the object being to provide a device of this character that will be simple in construction, easily cleaned, and that will occupy comparatively little space, thus particularly adapting it for use in dining-cars, restaurants, sample-rooms, and the like.

I will describe a water-cooler and refrigerator embodying my invention and then point out the novel features in the appended claims.

Reference is to be had to the accompanying drawings, forming a part of this specification, in which similar characters of reference indicate corresponding parts in both the figures.

Figure 1 is a sectional elevation of a water-cooler and refrigerator embodying my invention, and Fig. 2 is a section on the line 2 2 of Fig. 1.

The refrigerator comprises a casing 5, having a suitable door 6 at one side and a bottom wall 7, which is slightly concaved, and at the center of the bottom wall 7 is a removable cap 8, which supports a trap 9. The opening closed by this cap 8 provides communication with the interior of the casing for a purpose to be hereinafter described. Arranged above the bottom 7 is a ring-like plate 10, forming a support for the refrigerator, here shown in the form of a rack, consisting of inner uprights or bars 11 and outer uprights or bars 12. These bars are connected at the upper end to an annular plate 13 and at the lower end to an annular plate 14, these plates 13 and 14 being perforated to permit circulation of air. The refrigerator-rack is designed to rotate around the water-receptacle 15, and to permit the easy movements of the rack it is provided at suitable intervals with outer rollers 16 and inner rollers 17, traveling, respectively, in channels 18 19, formed in the ring-like plate 10.

The water-reservoir 15 removably rests on the inner edge of the ring-like plate 10, and it is provided with a cover 20. Also attached to the upper end of the reservoir 15 is a cover 21 for the casing 5. To make a practically air-tight connection between the cover 21 and the casing, the said casing is provided at its upper end with an annular concaved flange 22 for receiving the bead 23 on the edge of said cover 21.

Leading from the bottom of the reservoir 15 and out through the wall of the casing 5 is a water-discharge pipe 24, provided with a spigot 25 at its outer end, and the said pipe is connected to a nipple on the bottom of the reservoir 15 by means of a coupling 26. By removing the cap 8 a person may insert his hand to release the coupling 26, so that the water-reservoir may be removed for cleaning. The water from condensation will flow downward onto the bottom 7 and thence into the trap 9, and the overflow therefrom will pass into a suitable vessel arranged underneath the trap.

By arranging the refrigerator-rack so as to rotate articles to be cooled may be readily placed therein and on the ring-like plate 13, the ice being in the water-reservoir.

Having thus described my invention, I claim as new and desire to secure by Letters Patent—

1. A water-cooler comprising a casing having an opening in its bottom wall, a cap or closure for said opening, a ring-like plate supported in the casing above said bottom wall, a water-reservoir removably seated on said plate, a discharge-pipe having a coupling connection with the bottom of the reservoir above said cap or closure, and a rack supported on said ring-like plate and adapted to rotate around the reservoir.

2. A water-cooler and refrigerator comprising a casing having a door at one side, a concaved bottom for the casing having a central opening, a closure or cap for said opening, a trap supported by the closure or cap, a ring-like plate secured in the casing above the bottom and having annular channels, a rack, rollers supporting said rack and engaging in said channels, and a water-reservoir removably placed in the casing.

In testimony whereof I have signed my name to this specification in the presence of two subscribing witnesses.

JOHN WILLSON BROWN.

Witnesses:
　ISAAC LEWIS, Jr.,
　T. P. HUMPHREYS.